United States Patent [19]
Jones

[11] Patent Number: 5,822,878
[45] Date of Patent: Oct. 20, 1998

[54] MOTOR VEHICLE DRYER WITH OVOID SHAPED NOZZLE MEMBER

[75] Inventor: Allen Jones, Oneida, Wis.

[73] Assignee: PDQ Manufacturing, Inc., Green Bay, Wis.

[21] Appl. No.: 760,047

[22] Filed: Dec. 4, 1996

Related U.S. Application Data

[63] Continuation of Ser. No. 324,351, Oct. 17, 1994, Pat. No. 5,596,818.

[51] Int. Cl.$^6$ ..................................................... F26B 17/00
[52] U.S. Cl. ................................................ 34/585; 34/666
[58] Field of Search ............................. 34/585, 222, 558, 34/566, 666, 487, 488, 510, 641; 239/11, 101, 247, 265, 590, 587.1, DIG. 7; 15/316.1, 319; 134/57 R; 137/803

[56] References Cited

U.S. PATENT DOCUMENTS

| | | | |
|---|---|---|---|
| Re. 33,334 | 9/1990 | Nelson | 15/302 |
| 4,184,636 | 1/1980 | Bauer | 239/11 |
| 4,335,526 | 6/1982 | Smith | 34/229 |
| 4,393,602 | 7/1983 | Smith | 34/34 |
| 4,817,304 | 4/1989 | Belanger et al. | 34/243 C |
| 4,949,423 | 8/1990 | Larson et al. | 15/316.1 |
| 5,035,263 | 7/1991 | Mathews | 137/615 |
| 5,076,304 | 12/1991 | Mathews | 134/57 R |
| 5,093,951 | 3/1992 | Smith et al. | 15/53.2 |
| 5,367,739 | 11/1994 | Johnson | 34/666 X |
| 5,407,135 | 4/1995 | Jeffs | 239/288 |

FOREIGN PATENT DOCUMENTS

| | | |
|---|---|---|
| 455 441 | 11/1974 | Australia . |
| 0 489 234 | 6/1992 | European Pat. Off. . |
| 2 663 278 | 12/1991 | France . |
| 18 01 735 | 7/1971 | Germany . |

OTHER PUBLICATIONS

"Ryko–Monarch II" advertising brochure published Jun. 1991, Ryko Mfg. Co., Grimes, Iowa.
"Ready For The Future? . . . " PDQ Mfg., Inc., Green Bay, WI, published 1992.
"560 Wash'N Dri Automatic Rollover Car Wash", published by Slant Systems, Inc. at least as early as 1992.

*Primary Examiner*—Harold Joyce
*Assistant Examiner*—Steve Gravini
*Attorney, Agent, or Firm*—Andrus, Sceales, Starke & Sawall

[57] ABSTRACT

The dryer for a motor vehicle washing and drying system includes three downwardly-facing nozzles. The nozzles oscillate in a synchronized manner, with two side nozzles oscillating over a limited range only. A center nozzle, disposed between the two side nozzles, oscillates over a wider range to drive water on the upper surface of the vehicle towards the side nozzles. The side nozzles then drive the water along the contours of the vehicle surface down the sides of the vehicle using the Coanda effect. One of the side nozzles as well as the center nozzle is moved in an inward or outward direction depending upon the sensed width of the vehicle. The center nozzle is rotated in a forward or rearward direction as the vehicle moves underneath the dryer. Each nozzle contains a unique ovoid-shaped member disposed in the nozzle to accelerate and concentrate the output of the nozzles. The distance between the vehicle and the center nozzle is sensed by a triangulation sensor so that the output of the center nozzle may be adjusted as the height of the vehicle varies, and so that the center nozzle may be rotated in the forward or rearward direction.

10 Claims, 9 Drawing Sheets

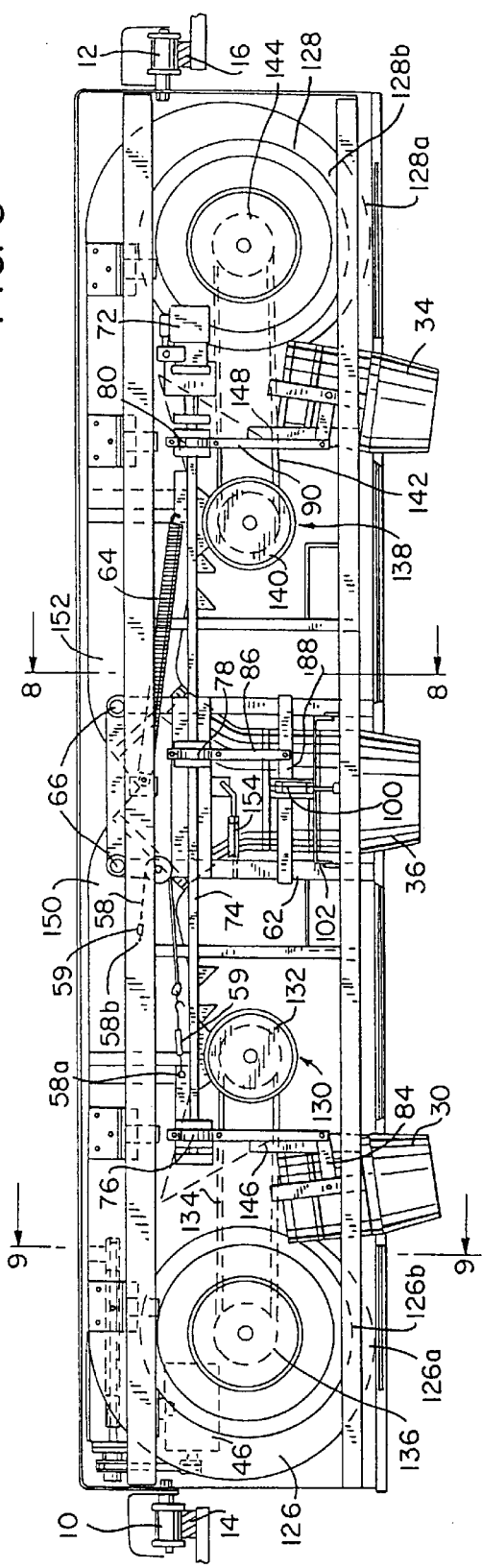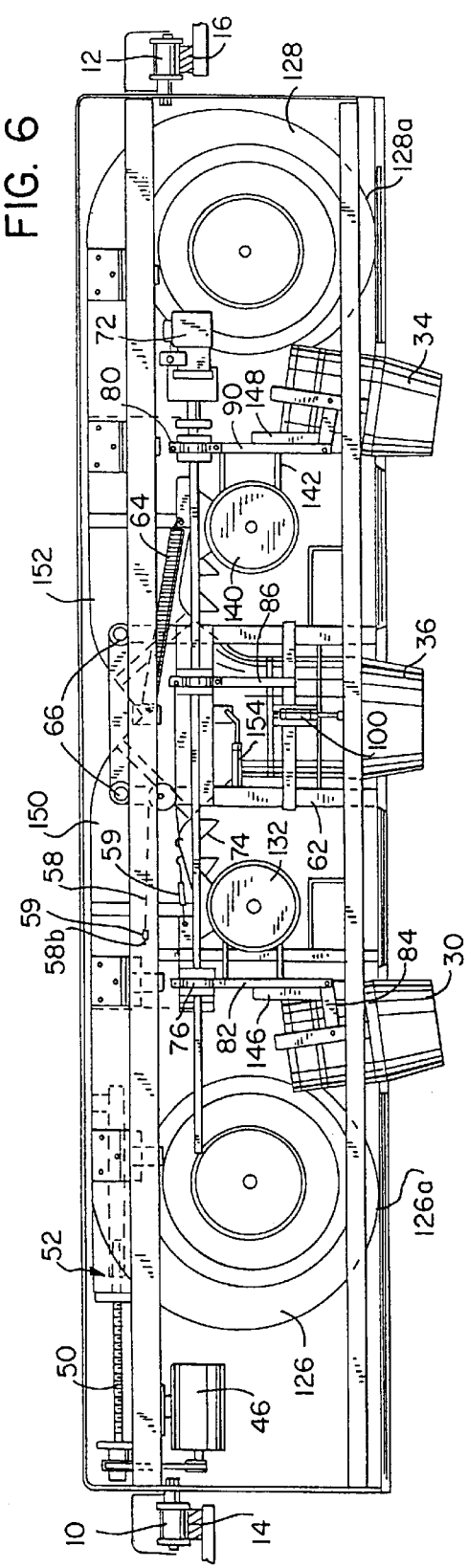

FIG. 10
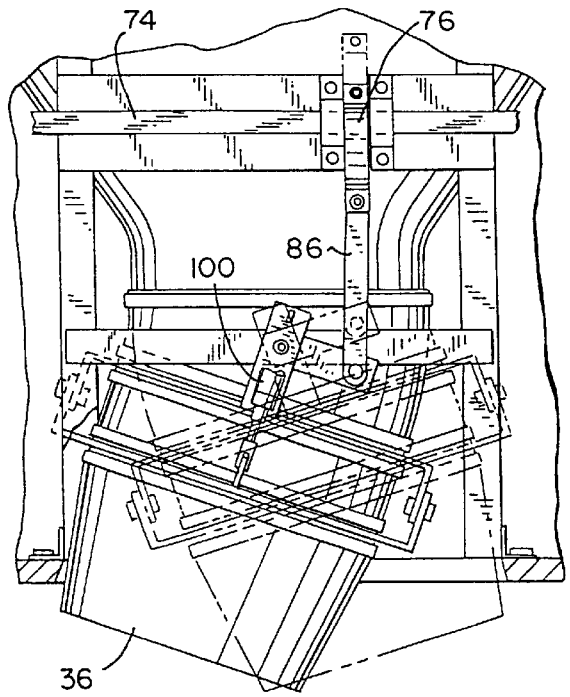
FIG. 11
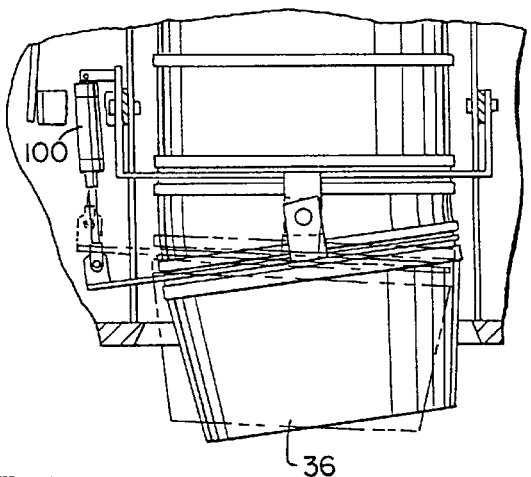
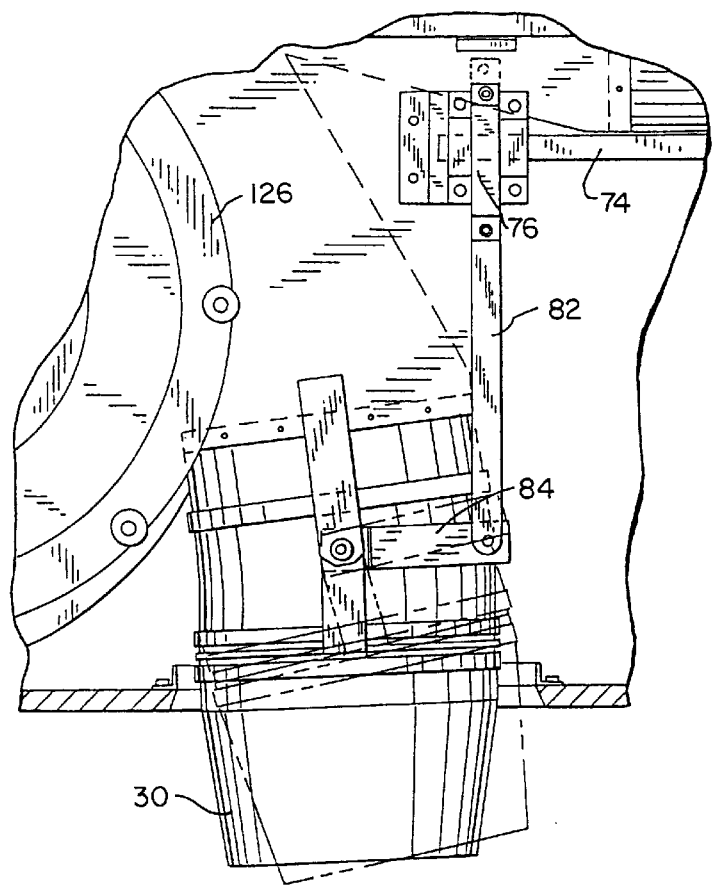
FIG. 12

MOTOR VEHICLE DRYER WITH OVOID SHAPED NOZZLE MEMBER

This application is a continuation of application Ser. No. 08/324,351 filed Oct. 17, 1994 now U.S. Pat. No. 5,596,818.

BACKGROUND OF THE INVENTION

This invention relates to commercial systems for washing and drying motor vehicles, such as those used in automatic car washes. More particularly, this invention relates to dryers used in motor vehicle washing and drying systems.

Several systems are known for automatically washing and drying motor vehicles. In a typical prior art system, a motor vehicle is driven onto a track which is used to mark or register one side of the vehicle. The vehicle then either remains stationary, or is moved as the washing and drying operations are performed. The location of the opposite, passenger side of the vehicle is typically determined by the washer using a contact sensor that engages the passenger side of the vehicle. The contact sensor outputs a signal indicative of the width of the vehicle, so that the washing system may adjust the proximity and/or movement of the washing brushes accordingly.

After the motor vehicle has been washed, it is typically dried by a dryer that includes one or more nozzles. The nozzles may oscillate or they may be stationary. In a typical prior art system, described in Reissue Pat. No. 33,334 issued Sep. 18, 1990, two oscillating nozzles are used to output high velocity air onto the motor vehicle. The nozzles oscillate over a wide angular range in an attempt to push the water toward the center of the vehicle and then down the front and down the rear of the vehicle. One of the nozzles is directed slightly toward the front of the vehicle, and the other nozzle is directed slightly toward the rear of the vehicle.

The vehicle dryer described in Reissue Pat. No. 33,334, as described above, has several disadvantages. First, the distance between the two opposed nozzles is not adjustable to accommodate vehicles of different sizes. Thus, the distance between the nozzles and the motor vehicle varies significantly depending upon whether a minivan, for example, is being dried or whether a small commuter-type automobile is being dried.

Another disadvantage of such prior art systems is that a significant amount of water remains on the motor vehicle after the drying cycle has finished. In such prior art systems having two nozzles, the oscillating nozzle tends to direct the water towards the central and furthermost top surfaces of the motor vehicle being dried. Since the movement of the water off the vehicle's surface is determined by the duration and momentum of the air from the nozzle, the surface areas furthest from the nozzle are not adequately dried, in part, because the air loses momentum before the air reaches the most distant surface areas.

Another reason that such prior art systems achieve incomplete drying is due to the nature of the oscillation cycles of their oscillating nozzles. In a typical prior art system, the nozzles are oscillated by air cylinders. The use of air cylinders results in oscillation cycles having a velocity profile over time that resembles a rectangular waveform. When two opposed oscillating nozzles are positioned as in Reissue Pat. No. 33,334, this velocity profile of a first nozzle causes some water to be moved to the central portion of the top vehicle surface, where the water remains until the second nozzle then pushes this water back to the place where it previously had been located, near the first nozzle. Thus, some of the water simply moves back and forth instead of being removed from the vehicle surface.

This back and forth movement of the water may be lessened to a certain degree by moving the dryer apparatus over the vehicle twice at a very slow speed, thereby substantially increasing the air's contact time with the vehicle. A substantial portion of the water will then be driven off the vehicle. However, this solution is unsatisfactory because the duration of the drying cycle is substantially increased to two or more minutes, thereby reducing the number of vehicles that can be dried in a given time period.

There are other drawbacks to prior art drying systems. For example, the typical prior art system has oscillating nozzles that oscillate at high cycle rates over wide angles of oscillation, on the theory that it is best to cover as much surface area as possible. In fact, however, the high cycle rates and wide angles of oscillation still result in significant amounts of water being left on the vehicle.

Another problem with typical prior art dryers is that the high velocity air output by the nozzles tends to lose much of its velocity and direction before the air has a chance to impinge on the more distant portions of the vehicle, such as the lower, side door panels and the central front and rear portions of the vehicle. One of the causes of this problem is that turbulent, ambient air in the dryer environment tends to diffuse the nozzle output air as the output air travels more distance from the nozzle.

SUMMARY OF THE INVENTION

An improved compact dryer system is provided for automatically drying motor vehicles, in which a higher proportion of the water is removed from the vehicle when compared to prior art dryers.

In a preferred embodiment, the dryer according to the present invention includes three spaced nozzles supported overhead by a support means. A first nozzle is directed toward the passenger portion of the vehicle, a second nozzle is directed towards the driver's side of the vehicle, and a center nozzle, disposed between the first and second nozzles, is directed towards a central portion of the vehicle. The dryer includes a blower means for providing a high velocity gas such as air to all of the nozzles. The nozzles are oscillated in a synchronized manner by an oscillating means. The positions of the nozzles on the support means and the velocity profile of oscillation by the oscillation means are selected such that the high velocity gas output by the nozzles tends to follow the vehicle surface to drive the water droplets off the vehicle.

The preferred embodiment also includes a means for changing the distance between the nozzles to accommodate vehicles of varying sizes. A photoelectric sensor supported by the support means outputs a light beam while the distance between the nozzles is being changed. The presence of the vehicle prevents the reflection of the light beam. When the light beam is reflected by a floor reflector and received by the photoelectric sensor, the sensor outputs a signal indicative of the width of the vehicle. The distance between the nozzles is then changed so that the center nozzle is centered across the width of the vehicle, and the first nozzle is disposed generally above the passenger side of the vehicle.

The invention also includes a means for sensing the distance between the center nozzle and the upper surface of the motor vehicle, and for changing the output of the center nozzle as a function of that distance. This feature enables the output of the center nozzle to be decreased when the roof of the vehicle is passing underneath the center nozzle, and to be increased when either the front or the rear of the vehicle is beneath the center nozzle. This feature also permits the output of the center nozzle to be decreased when a high vehicle—such as a minivan—is being dried to prevent denting of the vehicle's roof by the high velocity air. When the output of the center nozzle is decreased, the outputs of the two side nozzles are correspondingly increased.

Another key feature of the present invention is that the center nozzle may be rotated from a first position at which it is directed towards the front of the vehicle, to a second position at which it is directed towards the rear of the vehicle. This feature improves the drying of the vehicle since the output of the center nozzle is always leading the outputs of the two side nozzles, thereby tending to force the water toward the sides of the vehicles, whereupon the water is forced down the sides and off the vehicle by the side nozzles using the Coanda effect. The angular displacement of the nozzles during oscillation as well as the rate of oscillation are also limited to improve vehicular drying.

It is a feature and advantage of the present invention to provide a motor vehicle dryer which more effectively removes water from the vehicle.

It is another feature and advantage of the present invention to provide a vehicle dryer in which the air output by the nozzles has a high velocity while using smaller blower components.

It is yet another feature and advantage of the present invention to use the Coanda effect to drive water down the side contoured surfaces of the vehicle and off the bottom of the vehicle.

These and other features of the present invention will be apparent to those skilled in the art from the following detailed description of the preferred embodiments, and the drawings, in which:

BRIEF DESCRIPTION OF THE DRAWINGS

FIG. 5 is a front view of the dryer system with the front housing cover removed, and with the passenger side nozzle in an outward position to accommodate a wide vehicle.

FIG. 6 is a front view of the dryer system with the front housing cover removed, and with the passenger side nozzle in an inward position to accommodate a narrow vehicle.

FIG. 10 is a front view of the center nozzle assembly, shown in both the first and in the second position.

FIG. 11 is a side view of the center nozzle assembly.

FIG. 12 is a front view of the passenger's side nozzle assembly.

DETAILED DESCRIPTION OF THE PREFERRED EMBODIMENTS

The dryer according to the present invention may be used as a stand-alone unit, may be self-powered, or the dryer may be towed by a washing apparatus used to automatically wash motor vehicles. The dryer depicted and described herein is assumed to be a stand-alone unit. However, the preferred embodiment is readily adapted to being towed or self-powered, and is provided with rollers on opposite ends to permit the dryer to be towed along a track, as is well known in the art. FIGS. 1, 2, 6 and 7 depict rollers 10 and 12 which roll along respective tracks 14 and 16 when the dryer is being towed.

Figure 21:
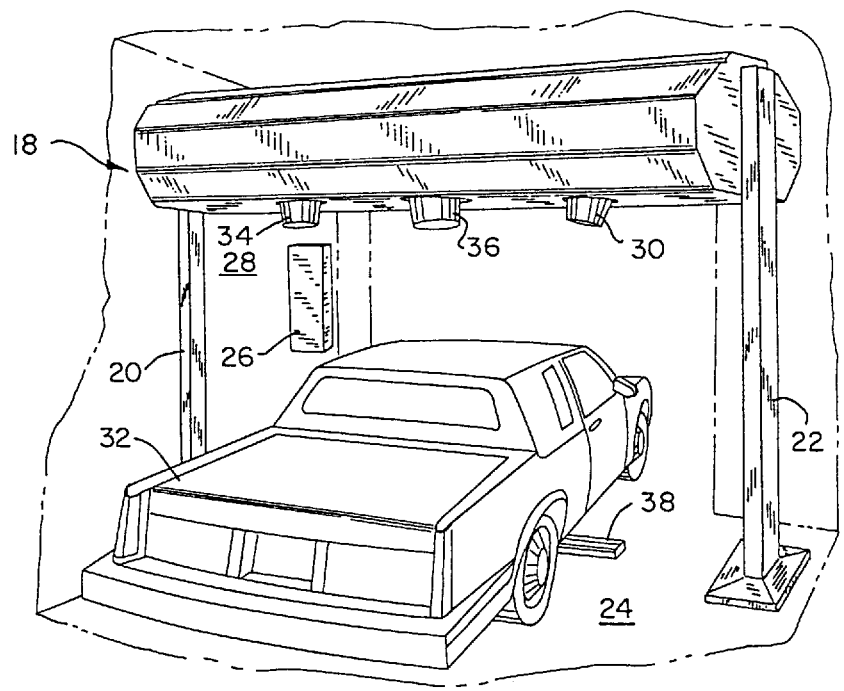
FIG. 21 is a perspective view of a free standing dryer according to the present invention.

FIG. 21 is a perspective view of a stand-alone dryer according to the present invention. In FIG. 21, dryer 18 is supported by two opposed legs 20 and 22. Legs 20 and 22 are secured to a concrete floor 24. Dryer 18 is a very compact unit, having a length from the front to the rear of the dryer of about 38 inches. A countdown display counter 26 is attached to a wall 28 of the car wash building.

Display counter 26 is desirable when stand-alone dryers are used because in such cases, the operator of the vehicle is typically inside the vehicle during the washing and drying processes. The operator must keep the vehicle under the stand-alone dryer unit for a specific amount of time—on the order of one minute—for proper drying to occur. Display counter 26 displays the number of seconds remaining on the drying cycle and may also indicate to the vehicle operator when he should stop his vehicle under the dryer and when he should proceed forward after the drying cycle has been completed.

Referring again to FIG. 21, dryer 18 includes a first nozzle 30 disposed generally above the passenger portion of vehicle 32, a second nozzle 34 generally disposed above the driver's side portion of vehicle 32, and a center nozzle 36 that is disposed between first nozzle 30 and second nozzle 34. Each of nozzles 30, 34 and 36 directs a high velocity gas, typically air, in a generally downward direction toward motor vehicle 32. Nozzles 30 and 34 are angled rearward approximately 10° to 15° from vertical toward the front of oncoming vehicle 32, with 15° being the preferred angle. Nozzles 30 and 34 are fixed at this angle to improve water removal from the vehicle. In the alternative, nozzles 30 and 34 could be rotated to face rearward and thereafter rotated to face forward, as is the case with center nozzle 36.

Center nozzle 36 preferably has a discharge opening that is greater in area than the discharge opening areas of nozzles 30 and 34. Vehicle 32 is positioned underneath dryer 18, between legs 20 and 22, and generally underneath nozzles 30, 34 and 36.

To reduce noise, nozzles 30, 34 and 36 and preferably made from an open cell polyurethane foam. This foam is covered by a skin of a latex or similar elastomeric material to protect the nozzles from moisture.

Also attached to floor 24 is a reflector 38, whose purpose will now be discussed in connection with FIG. 1.

Figure 1:
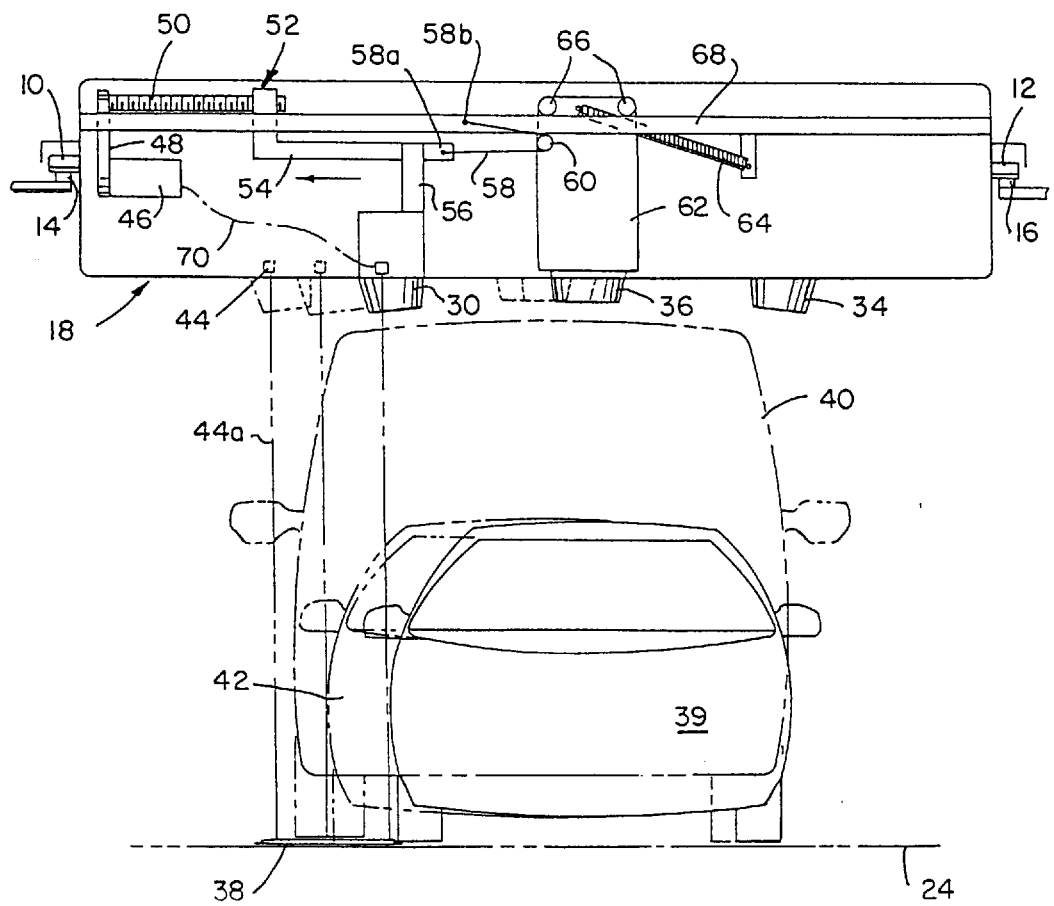
FIG. 1 is a diagrammatic front view of the dryer system according to the present invention depicting the means for changing the distance between the nozzles.

FIG. 1 is a front, diagrammatic view of dryer 18 of FIG. 21. FIG. 1 depicts the manner in which the distance between nozzles 30 and 36 is changed, as well as the manner in which the distance between nozzles 36 and 34 is changed. The purpose of this distance changing means is to accommodate motor vehicles of different sizes so that optimal drying of the vehicle is achieved. For example, if the motor vehicle is a small automobile such as vehicle 39, the distances between nozzles 30 and 36 on one hand and nozzle 34 on the other hand will be decreased so that nozzle 30 is directed generally over the passenger portion of the vehicle and nozzle 36 is centered over the center portion of the vehicle. If the vehicle is a pick-up truck or van such as vehicle 40 (depicted in phantom), nozzles 30 and 36 will move to their respective outermost positions (depicted in phantom) so that nozzle 30 is directed generally over the passenger side of the vehicle, and nozzle 36 is still centered over the roof of vehicle 40. Thus, the distances between nozzles 30 and 36 and nozzles 36 and 40 are increased when a larger vehicle is being dried.

If the vehicle is of an intermediate size such as vehicle 42 (depicted in phantom), nozzles 30 and 36 are moved to intermediate positions, also shown in phantom.

The mechanism for changing the distances between the nozzles operates in the following manner. Referring to FIGS. 1, 5, 6 and 9, nozzle 30 starts at its innermost position (FIG. 1), which is the default position, when no vehicle is being dried. Nozzle 30 is moved to the default position after a vehicle has been dried. Thereafter, nozzle 30 begins to move in an outward direction while a photoelectric sensor 44 outputs a light beam 44a that is reflected by reflector 38 when the motor vehicle is not positioned in the way of the light beam. The movement of nozzle 30 is accomplished by a reversible motor 46 whose output shaft is connected via a belt and pulley system 48 (FIG. 9) to a screw-threaded drive 50. Screw drive 50 is received in a receptacle assembly 52, which in turn is connected to nozzle 30 via arms 54 and 56. When reversible motor 46 turns in a first direction, belt 48 and screw drive 50 rotate to move nozzle 30 in a generally outward direction away from nozzle 34.

Receptacle assembly 52 is attached via a cable 58 and a pulley 60 to a trolley 62 that is interconnected with center nozzle 36. Cable 58 has turnbuckles 59 (FIGS. 5 and 6) to allow the length of the cable to be changed. The movement of trolley 62 is opposed by a return spring 64, which also pulls trolley 62 to the default position. Trolley 62 has four rollers 66 which roll along a rail 68. One end 58a of cable 58 is attached to receptacle assembly 52, and the opposite end 58b of cable 58 is attached to rail 68.

As receptacle assembly 52 moves in the generally outward direction, it pulls cable 58, thereby moving trolley 62 and center nozzle 36. However, the pulley system that connects trolley 62 to nozzle 30 is designed to create a 2:1 ratio, so that trolley 62 moves exactly one-half the distance of nozzle 30. This arrangement insures that center nozzle 36 is always centered over the vehicle.

Sensor 44 is interconnected with motor 46 via a wire 70 (FIG. 1). Sensor 44 does not receive any significant amount of reflected light as long as the motor vehicle is positioned below the light beam. As nozzle 30 and sensor 44 continue to move in a generally outward direction, light beam 44a, emanating from sensor 44, will eventually not be broken by the motor vehicle, and will be reflected by reflector 38. At that point, the distance changing mechanism knows that the width of the vehicle has been determined, and an output signal from sensor 44 is output on wire 70 to the control circuitry (FIG. 19), which in turn informs motor 46 to stop operation. When motor 46 stops, the positions of nozzles 30 and 36 remain fixed, with nozzle 30 being generally located over the passenger portion of the vehicle, and nozzle 36 being disposed over the center portion of the vehicle. When the drying operation has finished, nozzles 30 and 36 move in a direction toward nozzle 34 to the default position, to await the approach of the next vehicle.

Figure 2:
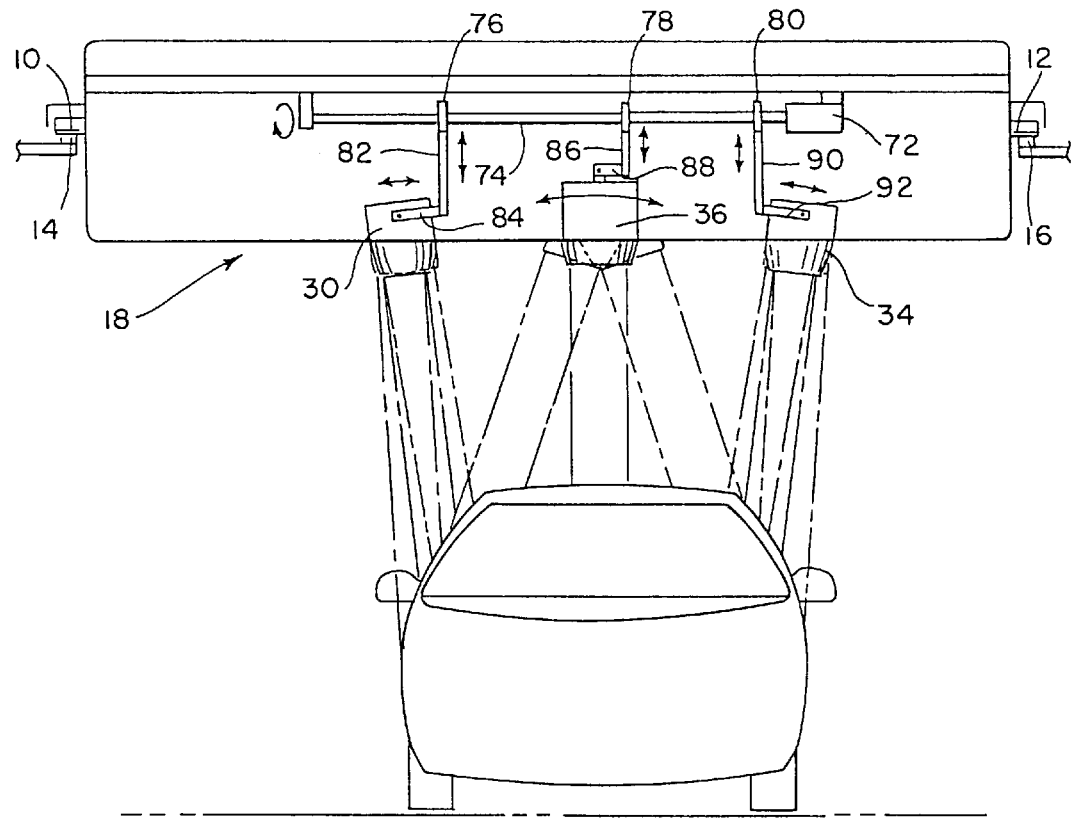
FIG. 2 is a diagrammatic view of the nozzles and the means for oscillating the nozzles, depicted from the front of the dryer.
Figure 3:
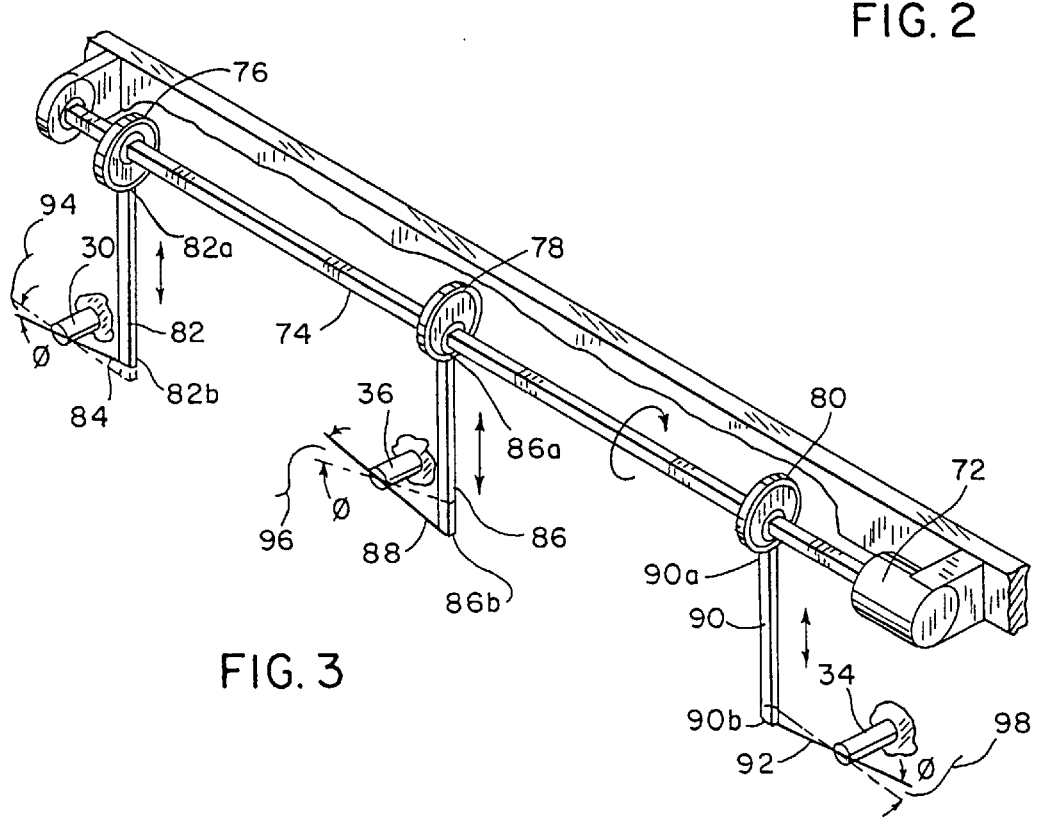
FIG. 3 is a perspective diagrammatic view of the means for oscillating the nozzles.

FIGS. 2 and 3 are diagrammatic views which depict the means for oscillating nozzles 30, 34 and 36. The nozzles are oscillated in a synchronized manner, with center nozzle 30 oscillating in a much greater arc than side nozzles 30 and 34. Nozzle 36 preferably oscillates between 30° to 40°, with 36° being preferred. That is, nozzle 36 will oscillate in a symmetrical manner from the vertical axis, so that nozzle 36 oscillates a positive 18° in one direction from the vertical axis toward the driver's side of the vehicle, and 18° in the opposite direction from the vertical axis toward the passenger's side of the vehicle. The purpose of the oscillation of nozzle 36 is to drive the water towards the sides of the vehicle, so that the water may be driven down the sides of the vehicle by nozzles 30 and 34 using the Coanda effect.

As used herein, the term "Coanda effect" refers to the tendency of fluids to cling to curved surfaces while passing over the surfaces. In the present invention, the air from the nozzles is directed such that the air flow tends to cling to the surface of the vehicle all the way down the sides of the vehicle, thereby driving water droplets off the lower portions of the vehicle body.

The purpose of the oscillation of side nozzles 30 and 34 is primarily to cause the water to be driven along the contours of the sides of the vehicle, down the sides of the vehicle, and off the vehicle using the Coanda effect. In prior art dryer systems, the side nozzles were oscillated over a very wide arcuate range, so that the largest possible surface area would be covered. However, the inventors herein have discovered that the oscillation of the side nozzles should be limited to a much narrower arcuate range when compared to prior art devices, to prevent the side nozzles from driving water which is on top of the vehicle toward the center of the vehicle, as in prior art dryer systems. The inventors have discovered that superior drying is achieved when an oscillating center nozzle forces the water towards the sides of the vehicle, and the side nozzles oscillate only enough to allow the water to follow the contours of the sides of the vehicle and down the vehicle sides.

The inventors herein have also discovered that superior drying is achieved when center nozzle 36 is rotated from a rearward-facing direction, to a forward-facing direction, as depicted and described in connection with FIG. 4 below. When center nozzle 36 is rotated in such a manner, while all of the nozzles are oscillating in synchronization, the water is driven either forward or rearward on the vehicle by the center nozzle, as well as off the top of the vehicle by the center nozzle. Thereafter, the oscillating side nozzles, whose output air actually lags the output air of the center nozzle due to the center nozzle's rotation, drive the water down the sides of the vehicle and off the vehicle.

Referring to the preferred embodiment depicted in FIG. 2, it is preferred that side nozzles 30 and 34 each oscillate about 2° to 6° from the vertical in their respective outward directions, with 4° being optimal. Nozzles 30 and 34 also preferably oscillate about 4° to 8° in their respective inward directions toward the center of the vehicle, with 6° being optimal.

The rate of oscillation is also limited to optimize water removal. Prior art dryer nozzles typically oscillate at 30 or more cycles per minute. In the present invention, the rate of oscillation is preferably between about 12 to 15 cycles per minute, to give the water time to be forced off the vehicle surfaces. Fifteen cycles per minute is preferred.

The actual means for achieving the oscillation is depicted in FIGS. 2 and 3, as well as in FIGS. 5, 6, and 12. Referring to these figures, an oscillation motor 72 turns a rectangular or square shaft 74, which is connected to rotate with the output shaft of motor 72. Spaced along shaft 74 are a plurality of eccentric cams 76, 78 and 80. A first end 82a of connecting rod 82 is connected to eccentric 76, with its opposite end 82b being connected to an arm 84 that is attached to nozzle 30. Similarly, a connecting rod 86 has its first end 86a connected to eccentric 78 and its opposite end 86b connected to arm 88, arm 88 being connected to nozzle 36. Also, connecting rod 90 has a first end 90a connected to eccentric cam 80, and its opposite end 90b connected to an arm 92. Arm 92 is connected to nozzle 34.

The use of a crank mechanism to oscillate the nozzles in the present invention yields an oscillation cycle for each nozzle having a sinusoidal velocity profile over time. As an oscillating nozzle in the present invention swings to direct air toward the most distant portion of the vehicle surface, the velocity of the nozzle begins to decrease. This reduced velocity near the ends of the nozzle's travel increases the amount of air that contacts the water on the vehicle surface when compared to prior art oscillating nozzles that have rectangularly-shaped velocity profiles. This reduction in the nozzle velocity near the ends of nozzle travel compensates for the increased surface area that must be covered near the ends of nozzle travel, and for the drop in air momentum that results from the increased distance between the nozzle and the vehicle surface area. Prior art oscillation systems using air cylinders do not achieve nozzle oscillation velocity profiles in which nozzle velocities are reduced near the ends of nozzle travel.

A major advantage of the oscillation mechanism according to the present invention is that the vehicle drying time is reduced to less than one minute while achieving superior drying. Prior art dryer systems would require two minutes or longer to achieve very good results.

The oscillation system operates in the following manner. In response to a control signal, motor 72 rotates shaft 74. The rotation of shaft 74 causes spaced eccentric cams 76, 78 and 80 to rotate with shaft 74. The rotation of cams 76, 78 and 80 causes their respective connecting arms 82, 86 and 90 to reciprocate, as depicted by the arrows in FIGS. 2 and 3. The reciprocation of connecting arms 82, 86 and 90 causes respective arms 84, 88 and 92 to move through respective arcs 94, 96 and 98, thereby oscillating their respective nozzles 30, 36 and 34. Arcs 94 and 98 are preferably 6°, with a range of 4° to 8° being acceptable. Arc 96 is preferably 36°, with a range of 30° to 40° being acceptable.

FIG. 10 is a front view of center nozzle 36, depicting the position of the nozzle at both extremes of its oscillation travel. FIG. 11 is a side view of nozzle 36. FIG. 12 is a front view of nozzle 30, depicting the movement of nozzle 30 in response to the rotation of shaft 74 and to the reciprocation of connecting rod 82 and arm 84.

As mentioned above, another feature of the present invention is that center nozzle 36 may be rotated or moved from a first position at which it is directed towards the front of the vehicle (rearward-facing), and then to a second position at which it is directed toward the rear of the vehicle (forward-facing). As the vehicle passes underneath the center nozzle, or as the center nozzle is towed with the dryer above the vehicle, the center nozzle rotates in response to the change of the distance between the upper surface of the vehicle and the center nozzle. This change in the distance is detected by a sensor 104 (FIG. 4); the change in this distance corresponds to the transitions from the front to the rear of the vehicle.

Figure 4:
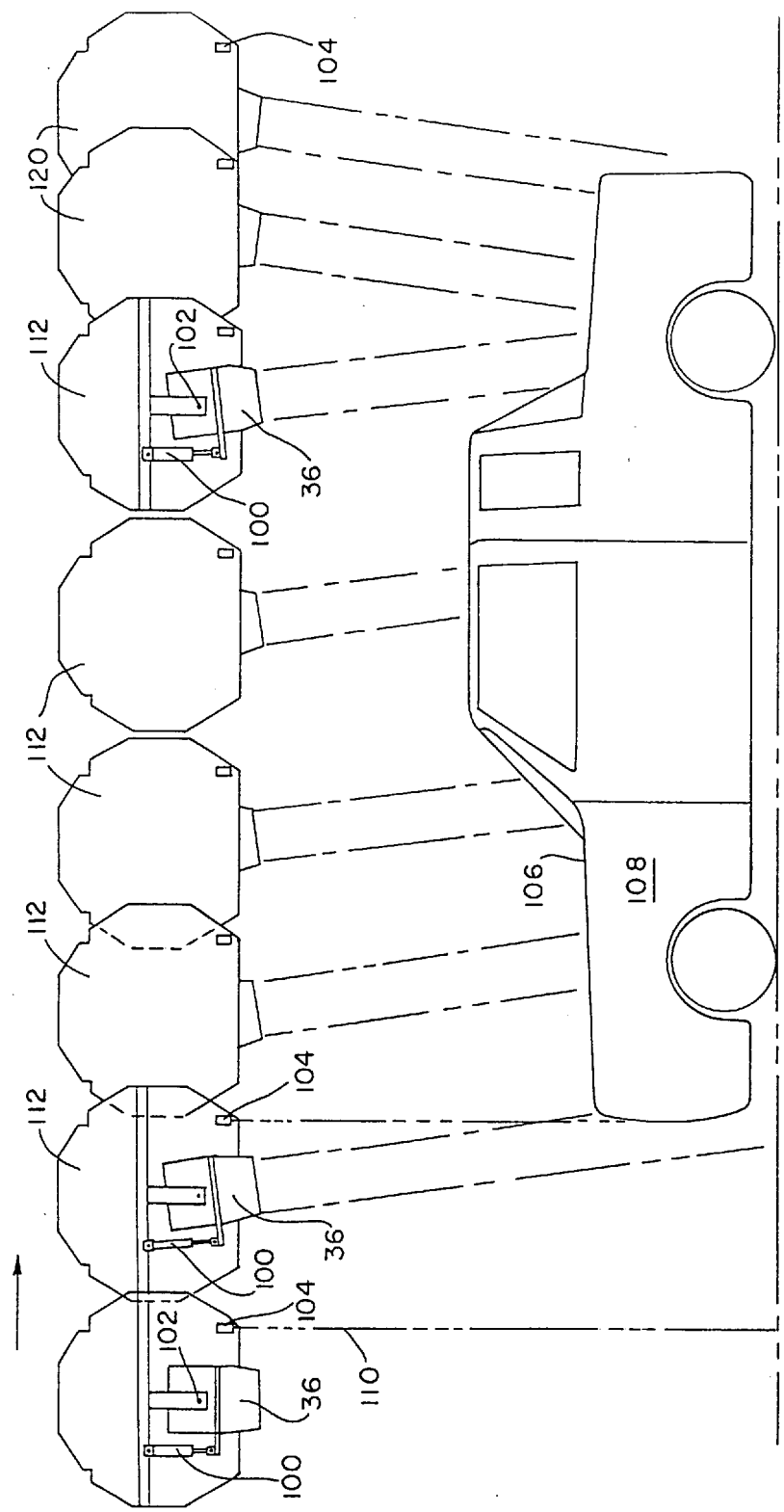
FIG. 4 is a side diagrammatic view depicting the means for moving the center nozzle between a first rearward-directed position and a second forward-directed position.
Figure 19:
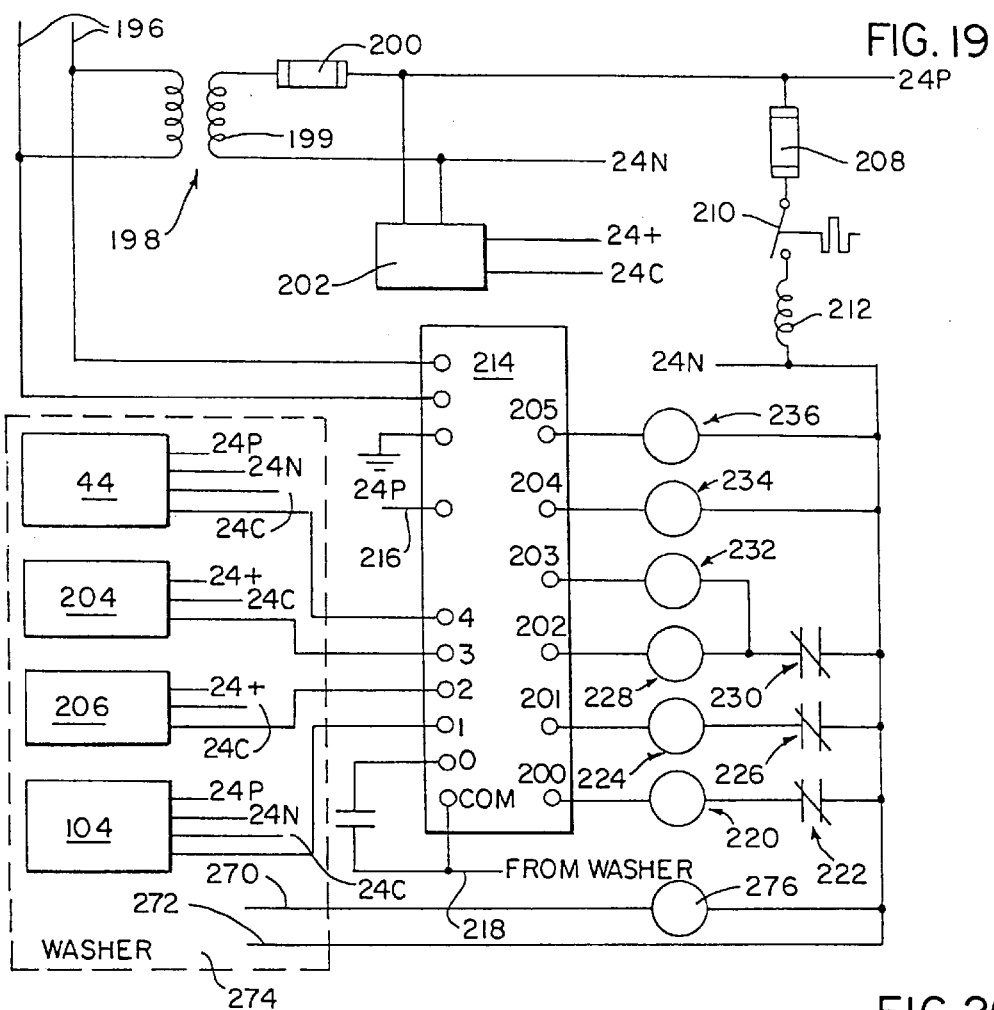
FIG. 19 is a schematic diagram of the dryer control circuitry used in the present invention.

This rotation of the center nozzle is best shown in the diagrammatic view of FIG. 4. In FIG. 4, nozzle 36 is interconnected with an air cylinder 100 which rotates nozzle 36 about a pivot 102. Air cylinder 100 is operated in response to a control signal from the control circuitry (FIG. 19).

In FIG. 4, the position of nozzle 36 and the operation of cylinder 100 are determined by the distance between a proximity sensor 104 disposed next to nozzle 36 and an upper surface 106 of motor vehicle 108. Sensor 104 is preferably a through beam type sensor.

In FIG. 4, sensor 104 outputs a light signal 110 that is reflected back to sensor 104 when upper surface 106 of vehicle 108 is detected. Nozzle 36 is initially directed towards the front of the vehicle since the front of the vehicle is always the first to pass underneath nozzle 36. This position of nozzle 36 is depicted as position 112 of FIG. 4. Position 112 is about 10° to 20° from vertical, with 15° to 18° being the preferred range.

Thereafter, nozzle 36 maintains position 112 as long as sensor 104 produces an output signal. The output signal of sensor 104 ceases when the roof of the vehicle passes under sensor 104, since at that time the distance between sensor 104 and vehicle surface 106 is less than a predetermined minimum distance. The sensor output signal is thereafter generated when the trunk of the vehicle—or the rear of the vehicle, in case of a van—is encountered. At that time, nozzle 36 rotates between about 13° to 30° until it is repositioned to a forward-facing position, depicted as position 120 in FIG. 4. Position 120 is about 3° to 10° from vertical, with 5° being the preferred angle. Nozzle 36 remains in position 120 until the drying cycle is completed.

In summary, nozzle 36 is rotated, as depicted in FIG. 4, to that position which optimally drives the water disposed on upper surface 106 down one of the side surfaces of the vehicle, so that nozzles 30 and 34 (FIG. 2) may then drive the water down the sides and toward the rear of the vehicle.

Figure 7:
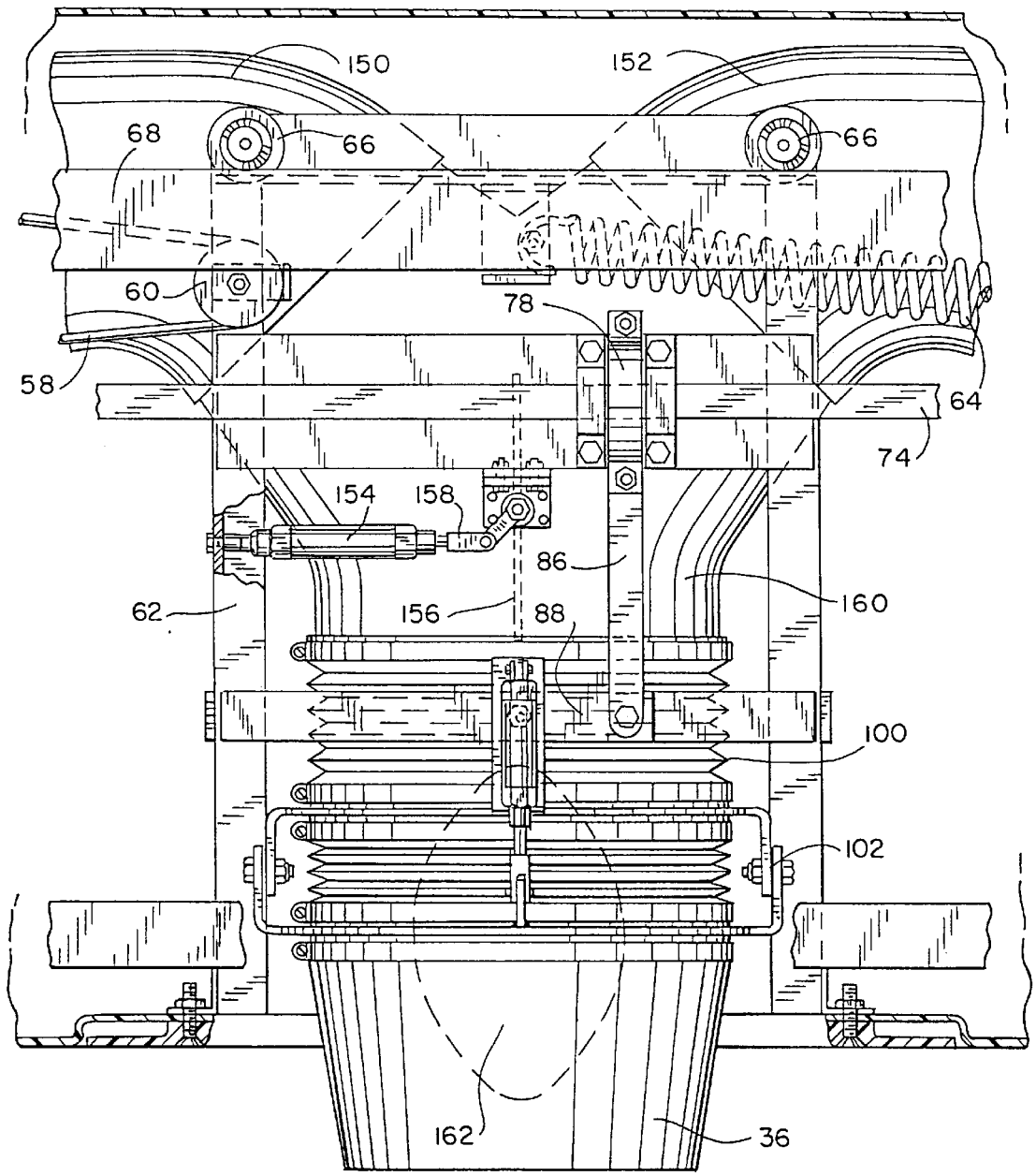
FIG. 7 is a front view of the center nozzle assembly.

FIGS. 7 and 11 both depict air cylinder 100, which is used to rotate center nozzle 36, as discussed above in connection with FIG. 4. FIG. 11 more particularly depicts the operation of air cylinder 100.

As best shown in FIGS. 5 and 6, each of nozzles 30 and 34 is supplied with a high velocity gas, such as air, from their respective blowers 126 and 128. Blower 126 is operated by a blower motor 130, which has a pulley 132 attached to its drive shaft. A belt 134 engages pulley 132 and a corresponding pulley 136 on fan 126. Similarly, blower 128 is powered by a blower motor 138 which has a pulley 140 attached to its drive shaft. Pulley 140 engages a belt 142, the latter engaging a pulley 144 on fan 128.

Fans 126 and 128 are commonly-available 15 hp fans, except that their sidewalls or scrolls have been modified to increase the volume output of the fans. In FIG. 5, scroll 126a of fan 126 has been moved radially outward from the center of blower 126, when compared to the commercially-available scroll, whose position would be at position 126b. Likewise, scroll 128a of fan 128 has been moved radially outward, when compared to position 128b of the scroll that is commercially-available.

To further increase the volume output of blowers 126 and 128, cutback plates 146 and 148 have been added to their respective nozzle assemblies 30 and 34. Cutback plates 146 and 148 direct more of the air output from blowers 126 and 128 respectively into their respective nozzles 30 and 34, to also increase the output of the nozzles.

Air is provided to nozzle 36 from both blowers 126 and 128. This is accomplished by having an air conduit 150 connected between fan 126 and nozzle 36, and a similar conduit 152 connected between fan 128 and nozzle 36. Thus, each of blowers 126 and 128 supplies high velocity air to two nozzles. Blower 126 supplies air to nozzles 30 and 36, and blower 128 supplies air to both nozzles 34 and 36.

The flow of air to nozzle 36 is controlled by an air reducing or dampening means which changes the output of the center nozzle as a function of the distance between the center nozzle and the upper surface of the motor vehicle. The output of the center nozzle is reduced to prevent damage to the roof of the vehicle when the high velocity air comes in contact with the vehicle roof.

Figure 8:
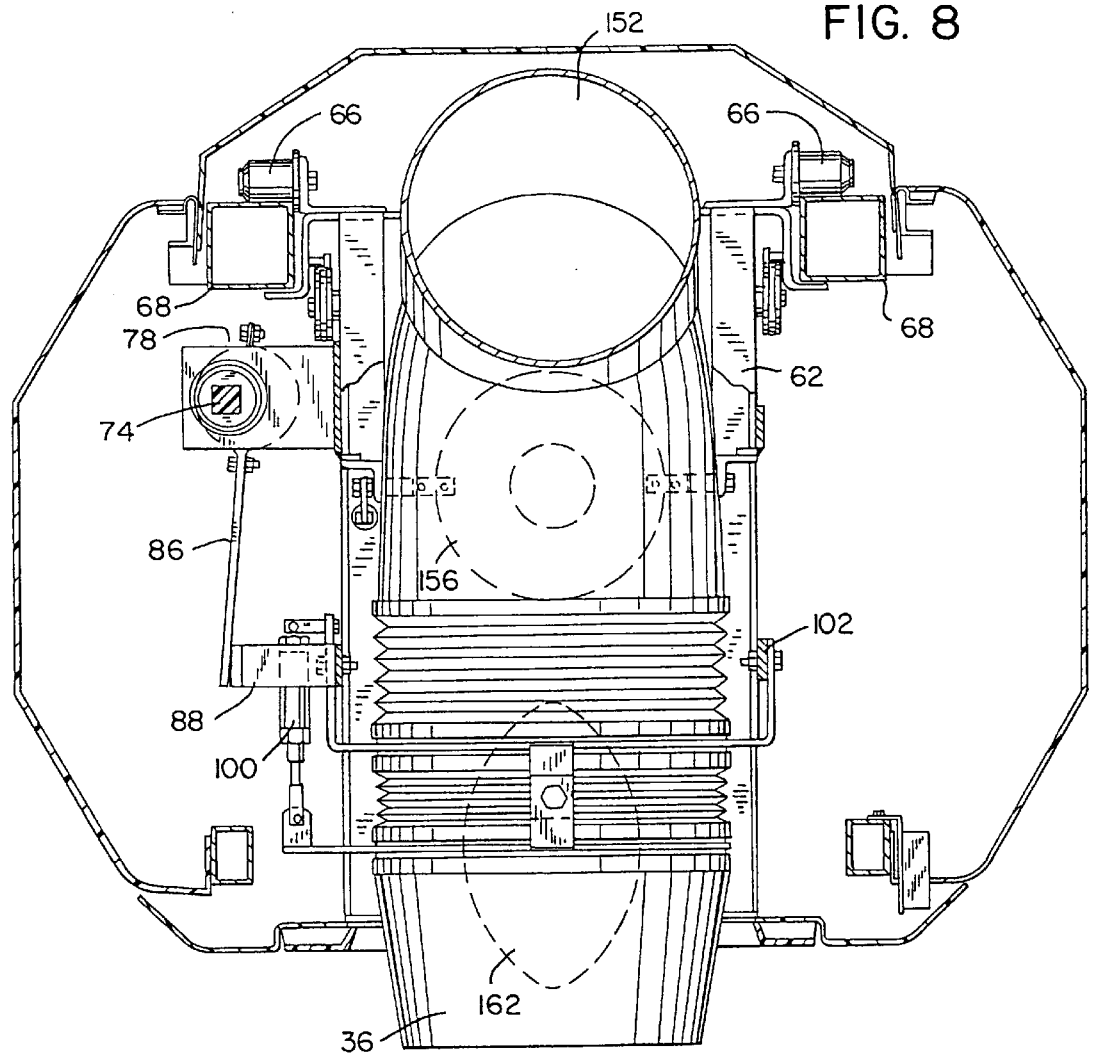
FIG. 8 is a side view of the center nozzle and the means for changing the output of the center nozzle, taken along line 8—8 of FIG. 5.
Figure 9:
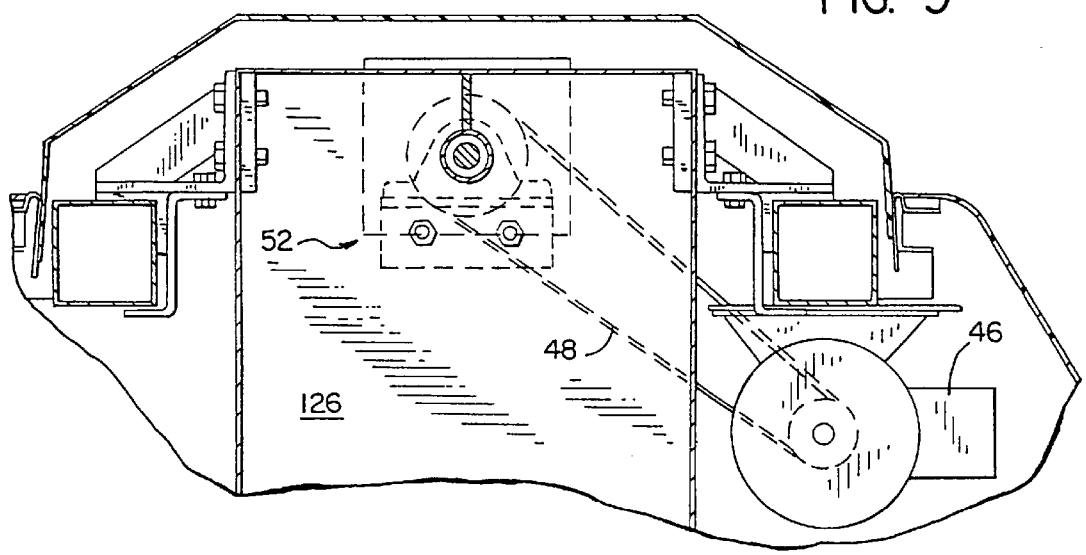
FIG. 9 is a cross-sectional view of a nozzle blower, taken along line 9—9 of FIG. 5.

The means by which the air supplied to center nozzle 36 is reduced is best shown in FIGS. 7 and 8. The dampening means in FIGS. 7 and 8 is responsive to the output of sensor 104 (FIG. 4), which sensor and its associated control circuitry (FIG. 19) compute the distance between upper surface 106 (FIG. 4) of vehicle 108 and center nozzle 36. In response to this distance computation, the control circuitry (FIG. 19) outputs a control signal to relay 154. In response to the control signal, relay 154 rotates a butterfly valve plate 156 via crank arm 158. The flow of air through conduit 160 is reduced as valve plate 156 is rotated from the vertical position depicted in FIGS. 7 and 8 to a non-vertical position. As the airflow through conduit 160 is reduced, the airflows to nozzles 30 and 34 (FIG. 5) are correspondingly increased. In other words, when a lower volume of air is required to push the water off of a relatively high vehicle roof, additional airflow is provided to the side nozzles since the side surfaces of the vehicle will tend to be larger, in that the distance between center nozzle 36 and the roof of the vehicle tends to be inversely proportional to the surface areas of the sides of the vehicle.

Figure 13:
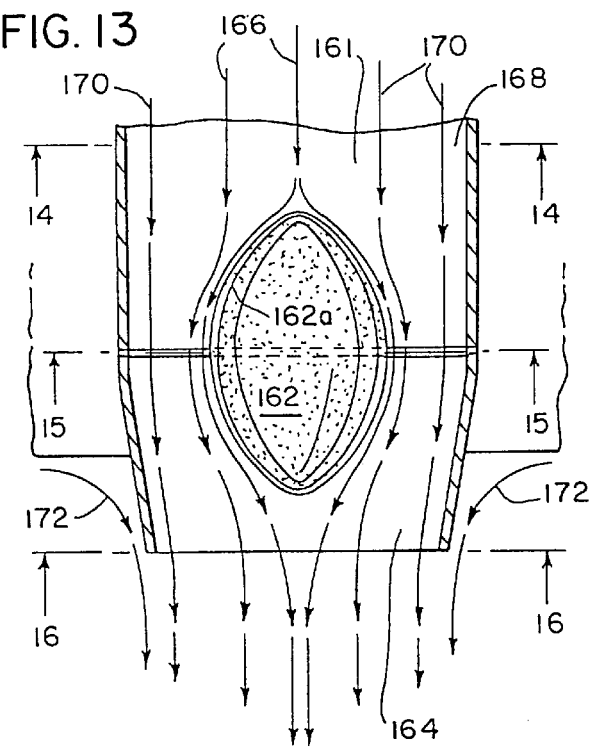
FIG. 13 is a diagrammatic view of a nozzle, depicting the airflow around the ovoid-shaped member and out the discharge opening of the nozzle.
Figure 14:
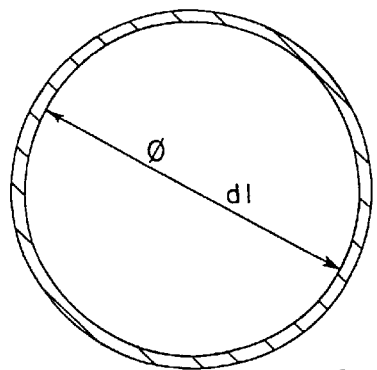
FIG. 14 is a cross-sectional view of a nozzle, taken along line 14—14 of FIG. 13.
Figure 15:
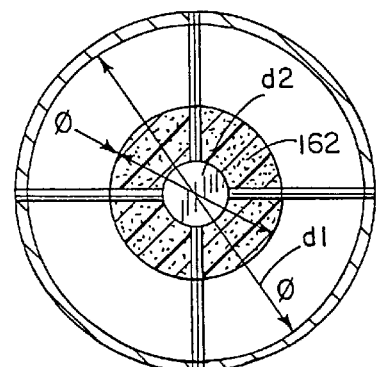
FIG. 15 is a cross-sectional view of a nozzle, taken along line 15—15 of FIG. 13.

FIGS. 13 through 16 all relate to another feature of the present invention, namely that air output from a nozzle has both its velocity component and its direction component in the desired direction of travel increased as a result of the placement of an ovoid-shaped member of the central portion of the nozzle. As used herein, the term "ovoid-shaped" refers to a three dimensional shape which is substantially the shape of a football, and is sometimes referred to as "egg-shaped", or an inflated three-dimensional oval shape. In FIG. 13, ovoid-shaped element 162 is disposed within each of the nozzles 30, 34 and 36 such that element 162 is centered within the nozzle near discharge end 164 of the nozzle. The shape of element 162 causes the airflow, indicated by arrows 166, to follow outer surface 162a of element 162 due to the Coanda effect. At the same time, those portions of the airflow closest to curved wall 168 of the nozzle, indicated by arrows 170, are also accelerated and channeled in a proper direction due to the constriction resulting from the placement of element 162 within the nozzle. This constriction is best shown in FIG. 15.

To reduce noise, ovoid-shaped member 162 is made from an open cell polyurethane foam. The foam is protected from moisture by covering member 162 with a skin made from latex or a similar elastomeric material.

In FIG. 13, the air output from discharge end 164 of nozzle 161 is further channeled due to the flow of the ambient air near discharge end 164 of the nozzle. The ambient airflow is indicated by arrows 172. The ambient airflow near discharge end 164 of the nozzle corresponds to the airflow within the building which houses the vehicle drying system. This ambient airflow results from the output of the other nozzles, as well as the shape of the building itself.

The channeling of the nozzle output air according to the present invention is achieved by element 162, the geometry of nozzle 161, as well as the flow of ambient air 172. This output air channeling causes the air output at discharge end 164 to have a higher velocity and a proportionally larger directional component in the downward direction when compared to prior art nozzles. These features of the present invention, together with the oscillation and rotation of the nozzles as discussed above to yield the Coanda effect, allow smaller-sized blower components to be used when compared to prior art devices while achieving superior results when compared to prior art devices. For example, a typical prior art system uses blowers having a rating of 40 hp, whereas the present invention only requires blowers having a rating of 30 hp to yield superior results.

Another purpose of the nozzle configuration depicted in FIG. 13 is to smooth out the otherwise pulsed nature of the air output from the nozzles. The blowers used for the dryer, such as blowers 126 and 128 (FIG. 5) as well as prior art blowers, tend to output pulses of air as opposed to continuous airflow. These pulses are caused by the configuration of the blowers themselves, and particularly the design and spacing of the fan blades within the blowers. In the present invention, these air pulses are smoothed to yield a more continuous airflow by providing element 162 as well as the constriction between outer surface 162a of element 162 and curved wall 168 of nozzle 161.

Figure 16:
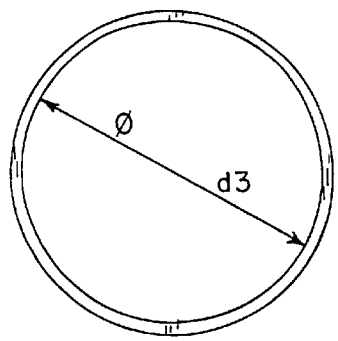
FIG. 16 is an end view of the nozzle discharge opening, taken along line 16—16 of FIG. 13.

FIGS. 14 through 16 more clearly illustrate the restrictions within nozzle 161. FIG. 14 is a cross-sectional view taken along line 14—14 of FIG. 13. The cross-sectional view in FIG. 14 has a diameter d1, and thus, a cross-sectional area of $\pi(d1/2)^2$.

As shown in FIG. 15, ovoid-shaped element 162 has a diameter d2 at its widest point, and thus a cross-sectional area at its widest point of $\pi(d2/2)^2$. Therefore, the area A1 of planar section 174 is equal to $\pi[(d1/2)^2-(d2/2)^2]$.

FIG. 16 depicts discharge end 164 of nozzle 161. Discharge end 164 has a diameter d3, so that the cross-sectional area of discharge end 164 is $\pi(d3/2)^2$.

To achieve maximum benefit from the nozzle and ovoid-shaped element configuration according to the present invention, it is desirable that area A1 of space 174 (FIG. 15) be slightly less than or equal to the area of discharge opening 164 of the nozzle. In other words, $\pi[(d1/2)^2-(d2/2)^2] \leq \pi(d3/2)^2$.

Figure 17:
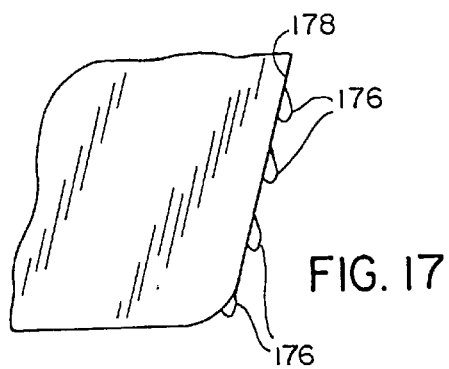
FIG. 17 depicts water droplets clinging to a side surface of a vehicle.
Figure 18:
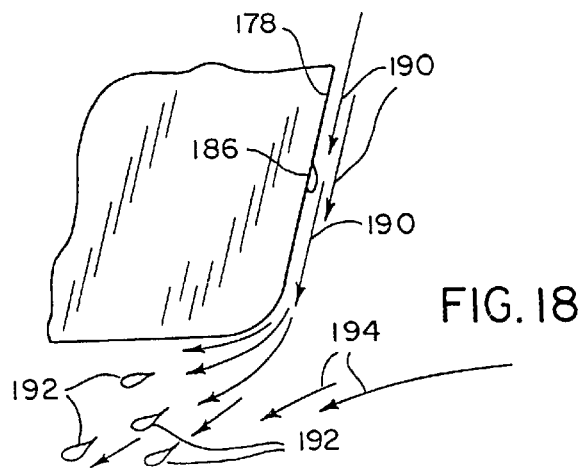
FIG. 18 depicts water droplets being driven off a bottom vehicular surface using the Coanda effect according to the present invention.

FIGS. 17 and 18 are used to illustrate another important feature of the present invention, namely the Coanda effect. As referenced above, the present invention synchronizes the oscillation of the nozzles, and selects the speed of oscillation, the positions of the side nozzles, the arcs through which the side nozzles oscillate, the forward and rearward rotation of the center nozzle, and the speed at which the dryer system changes position with respect to the motor vehicle (preferably at a rate of 15 cycles per second) to optimize the water removal from the motor vehicle by means of the Coanda effect. These components operate together to drive the water droplets down the sides of the vehicle, with the airflow tending to follow and cling to the contoured surface of the vehicular sides due to the Coanda effect.

FIG. 17 depicts water droplets 176 along a lower surface 178 of a motor vehicle. As shown in FIG. 17, water droplets 176 follow the contour of surface 178, and indeed will, despite gravity, cling to surface 178.

In FIG. 18, water droplet 186 is driven downward along surface 178 by the airflow from the nozzles, represented by arrows 190. Airflow 190 tends to follow curved surface 178, in accordance with the Coanda effect. At the same time, droplets 192 are driven off of the vehicle by both nozzle airflow 190 and the ambient airflow, represented by arrows 194. By contrast, prior art dryers drove much of the water to the center and rear of the vehicle, and indeed often drove the water upward against gravity. As a result, significant amounts of water remained on the upper surface of the vehicle when prior art dryers were used. However, the present invention uses a different approach to drying, resulting in significantly improved water removal.

Figure 20:
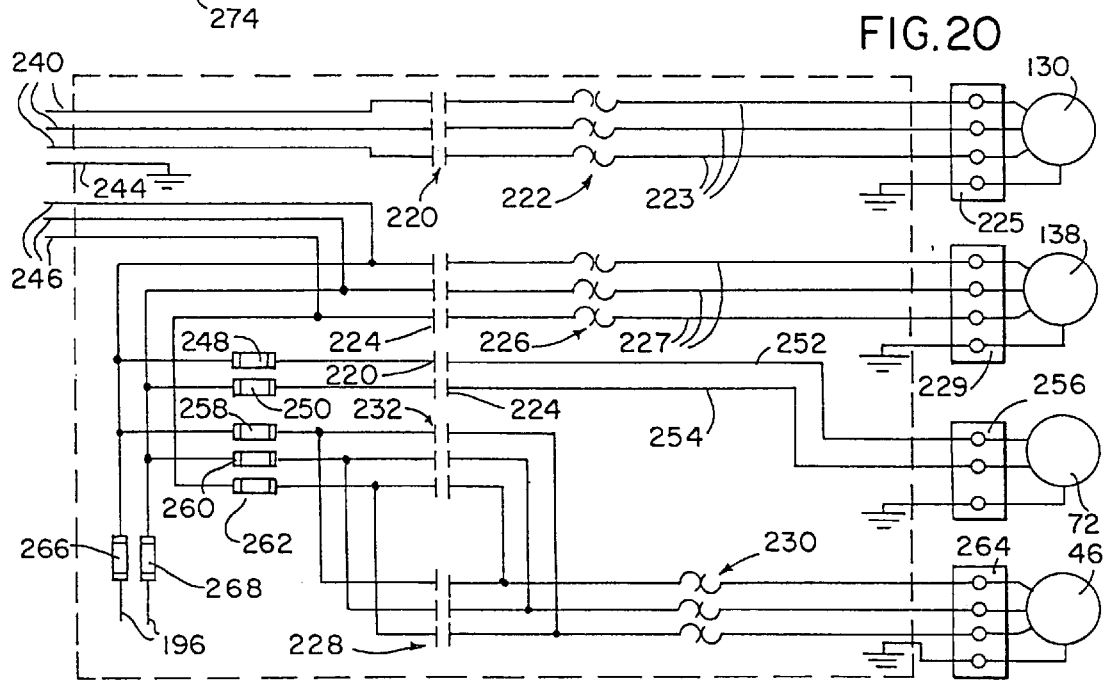
FIG. 20 is a schematic diagram of the high voltage circuitry used to power the motors in the present invention.

FIGS. 19 and 20 are schematic diagrams depicting the electronics used in the dryer system according to the present invention. FIG. 19 is a schematic diagram of the low voltage side of the control electronics. FIG. 20 is a schematic diagram of the high voltage circuit used to power the motors and the dryer system.

Referring to FIG. 19, lines 196 together form an AC line power input. The AC line power is transformed to 24 volt power by a transformer 198, the transformer including a secondary winding 199. A fuse 200 is connected on the secondary side of transformer 198. A DC power supply 200 is connected across secondary winding 199, and is used to provide 24 volts DC to two proximity switches 204 and 206.

The phase side of secondary winding 199 is connected to a fuse 208, which in turn is connected to a thermal couple switch 210 for heater 212. Heater 212 is necessary since the dryer typically will not operate below 0° Celsius; switch 210 is set to close and thereby activate the heater at that temperature. Heater 212, which typically includes a resistive coil, has its negative side connected to line 24N.

AC lines 196 are also connected to power a programmable logic controller (PLC) 214. 24 volts of DC power is provided to PLC 214 via line 216. A signal from the associated washer system is input on line 218 to communication pin 0 of PLC 214. The signal on line 218 informs PLC 214 that the drying operation should begin.

The other inputs to PLC 214 are from the dryer sensors and proximity switches. The output of the vehicular height measurement sensor 104 (FIG. 4) is input to pin 1 of PLC 214. Similarly, the output of width measurement sensor 44 (FIG. 1) is provided to pin 4 of PLC 214. Proximity switches 204 and 206 are used to override the width measurement sensor to limit the travel of passenger side nozzle 30 (FIG. 1) within prescribed limits. Sensor 204 limits the outward travel of nozzle 30, whereas sensor 206 provides a signal on pin 3 of PLC 214 which instructs the PLC to stop the inward travel of blower 126 and nozzle 30.

Pins 200 through pin 204 comprise the outputs of PLC 214. Pin 200 is connected to a contactor 220, which in turn is connected to an overload relay 222. Pin 201 of PLC 214 is connected to a contactor 224, which in turn is connected to an overload relay 226. Pin 202 is connected to contactor coil 228, which in turn is connected to overload relay 230. Pin 203 is connected to contactor coil 232, which in turn is connected to overload relay 230. Pin 204 is connected to contactor coil 234, and pin 205 is connected to contactor 236.

In FIG. 19, lines 270 and 272 are connected between washer 274 and the neutral side of secondary winding 199. A contactor coil 276 is interposed between line 270 and a neutral side 24N of secondary winding 199. A common line 24C of DC power supply 202 is connected to each of sensors 44, 204, 206, and 104.

FIG. 20 depicts the remainder of the electronic control circuit. In FIG. 20, AC line power is provided via lines 240 and 196. Line 244 is connected to ground. Lines 240 provide AC line power to fan motor 130 through contactor 220 and overload relay 222. Motor 130 is connected to lines 223 at a junction box 225.

Lines 196 provide AC line power to motor 138 through contactor 224 and overload relay 226. Motor 138 is connected to lines 227 at a junction box 229. Lines 246 are connected to a circuit breaker (not shown) provided at the dryer installation site.

Lines 196 are connected through fuses 248 and 250 to contactors 220 and 224 respectively. Lines 252 and 254 are connected between contactors 220 and 224 respectively and a junction box 256. Motor 72 is connected to lines 252 and 254 at junction box 256.

Lines 196 also provide power to motor 46 through fuses 258, 260, and 262, contactors 232 and 228, overload relay 230, and junction box 264. Fuses 266 and 268 are connected in series with lines 196.

The circuits depicted in FIGS. 19 and 20 operate in the following manner. After a vehicle has been dried, PLC 214 outputs a signal on pin 202, thereby causing motor 46 to move nozzle 30 in an inward direction to the default position. When drying is to begin on the next vehicle, PLC 214 outputs a signal at pin 203, thereby causing motor 46 to move nozzle 130 in the outward direction. This outward movement continues until a reflected signal is received by sensor 44, indicating that the width of the vehicle has been determined. PLC 214 then changes the state of the signal at pin 203, thereby stopping motor 46.

Sensor 104 outputs a signal functionally related to the measured distance between the upper surface of the motor vehicle and sensor 104. This output signal is received at pin 1 of PLC 214. In response, PLC 214 may output a control signal at pin 205 to air cylinder 100 through contactor 236, thereby causing center nozzle 36 to rotate in either the forward or the rearward direction.

Also in response to the measured distance between sensor 104 and the upper surface of the vehicle, PLC 214 may output a signal at pin 204 to contactor 234 and thus to damper solenoid 154 (FIG. 7), thereby dampening or otherwise changing the output of center nozzle 36.

While a preferred embodiment of the present invention has been shown and described, alternate embodiments will be apparent to those skilled in the art and are within the intended scope of the present invention. Therefore, the invention is to be limited only by the following claims.

I claim:

1. A dryer used to dry a motor vehicle, comprising:
   at least one blower for providing a gas;
   a nozzle for directing the flow of gas from the blower into contact with the vehicle, the nozzle having a discharge opening and a cavity formed by a sidewall; and an ovoid-shaped member positioned within the cavity inwardly from the discharge opening and the sidewall, the ovoid-shaped member having an outer surface shaped to allow passage of gas therealong by the Coanda effect.

2. The dryer of claim 1, wherein said ovoid-shaped member comprises an open cell foam covered by an elastomeric material.

3. The dryer of claim 1, wherein said ovoid-shaped member is substantially football-shaped.

4. The dryer of claim 1, wherein said outer surface portion is spaced from a side wall of said nozzle cavity.

5. The dryer of claim 1, wherein said side wall is comprised of a substantially curved surface.

6. The dryer of claim 5, wherein the cross-sectional area between the outer surface portion of the ovoid-shaped member and the nozzle side wall is less than or equal to the cross-sectional area at said gas generation outlet.

7. The dryer of claim 1 wherein the cross-sectional area of the nozzle above the ovoid-shaped member is greater than the cross sectional area between the outer surface portion of the ovoid-shaped member and the nozzle sidewall, such that the velocity of the gas flowing through the nozzle is increased upon contact with the ovoid-shaped member.

8. The dryer of claim 7 wherein the cross-sectional area between the outer surface portion of the ovoid-shaped member and the nozzle sidewall is less than or equal to the cross-sectional area at the discharge opening, such that the velocity of the gas flowing through the nozzle remains approximately constant after passing by the ovoid-shaped member.

9. The dryer of claim 1 wherein the ovoid-shaped member includes an upstream end and a downstream end, the downstream end being spaced from the discharge opening such that the sidewall directs the flow of gas from the ovoid-shaped member to the discharge opening.

10. The dryer of claim 9 wherein the sidewall of the nozzle is tapered from a position corresponding to a midpoint of the ovoid-shaped member between the upstream end and the downstream end to the discharge opening, such that the velocity of the gas remains approximately constant from the midpoint of the ovoid-shaped member to the discharge opening.

* * * * *